United States Patent
Drei et al.

(10) Patent No.: US 6,758,650 B2
(45) Date of Patent: Jul. 6, 2004

(54) BAR GUIDING DEVICE IN A FEEDER FOR FEEDING MACHINE TOOLS

(75) Inventors: Andrea Drei, Faenza (IT); Pierantonio Melandri, Faenza (IT)

(73) Assignee: IEMCA Giuliani Macchine Italia S.p.A., Faenza (IT)

( * ) Notice: Subject to any disclaimer, the term of this patent is extended or adjusted under 35 U.S.C. 154(b) by 11 days.

(21) Appl. No.: 10/307,332

(22) Filed: Dec. 2, 2002

(65) Prior Publication Data

US 2003/0118434 A1 Jun. 26, 2003

(30) Foreign Application Priority Data

Dec. 21, 2001 (IT) ...................................... BO2001A0770

(51) Int. Cl.⁷ ............................................... B66F 11/00
(52) U.S. Cl. ............................... 414/745.1; 198/735.3; 198/735.5; 82/127; 82/163
(58) Field of Search ........................... 198/735.3, 735.5; 414/745.1; 82/127, 162, 163

(56) References Cited

U.S. PATENT DOCUMENTS

| | | | |
|---|---|---|---|
| 4,049,173 A | * | 9/1977 | Gomez-Alecha ............. 82/163 |
| 4,977,801 A | * | 12/1990 | Fabbri ......................... 82/127 |
| 5,584,648 A | * | 12/1996 | Camelli et al. .......... 414/746.7 |

* cited by examiner

Primary Examiner—Joseph E. Valenza
(74) Attorney, Agent, or Firm—Guido Modiano; Albert Josif; Daniel O'Byrne

(57) ABSTRACT

A bar guiding device in a feeder for feeding a machine tool, composed of two elements that have respective slots and can move with respect to each other between an open position, which allows insertion of a bar between them, and a mutually adjacent position, at which the slots form a longitudinal channel for advancement of a bar to be fed to the machine tool by way of a bar pusher connected to an actuation chain that is external to the channel by means of a bridge that is guided through regions where the elements mate, the regions being in mutual contact, so as to close the channel, and undergoing elastic deformation in order to allow passage of the bridge between them.

7 Claims, 6 Drawing Sheets

BAR GUIDING DEVICE IN A FEEDER FOR FEEDING MACHINE TOOLS

BACKGROUND OF THE INVENTION

The present invention relates to a bar guiding device in a feeder for feeding machine tools.

Devices having various structures are known which, in feeders for feeding bars in machine tools, allow to keep the bars guided during the intended machining operations. The most common devices consist of a pair of longitudinally superimposed half-shells that are articulated one another and comprise mutually opposite semicylindrical cavities. By means of suitable actuators, the half-shells are actuated between an open position, in order to allow to insert a bar in the cavity of one half-shell, and a closed position, in which the cavities of the two half-shells are mutually integrated so as to form a channel along which the bar is pushed toward the machine tool. In some embodiments, each half-shell is constituted by a plurality of longitudinally aligned sections.

In particular, Italian patent No. 1,266,350 discloses a guiding device composed of a plurality of pairs of sprockets that mesh together and are provided with polygonal peripheral slots that decrease in depth and form passage and guiding openings for a bar that is driven through them.

In known devices of the described type, the advancement of the bars along the guiding channel is provided by means of an appropriately provided pusher (known as bar pusher), which is connected by means of a bridge to an actuation chain, which lies outside the channel. The bridge is constituted by a plate which, during the advancement of the bar pusher, moves between the contiguous edges that delimit the bar guiding channel on the longitudinal opening side.

In order to allow passage of the bridge, the contiguous edges of the channel must be spaced at least by an extent equal to the thickness of the bridge. In this manner, the guiding channel is open longitudinally through a slit that produces internal edges, against which the bar makes sliding contact during machining. However, if the bar has a polygonal cross-section, during its rotation the edges of the bar collide against the inner edges of the cap, causing damaging vibration and intolerable noise.

SUMMARY OF THE INVENTION

The aim of the present invention is to provide a guiding device for bars that allows to obviate these shortcomings suffered by known devices.

Within this aim, an object of the present invention is to provide a device that is flexible in use and is suitable to be used in feeders of various design.

This aim and this and other objects that will become better apparent hereinafter are achieved by a bar guiding device in a feeder for feeding a machine tool, composed of two elements that have respective slots and can move with respect to each other between an open position, which allows insertion of a bar between them, and a mutually adjacent position, at which said slots form a longitudinal channel for the advancement of a bar to be fed to the machine tool by means of a bar pusher connected to an actuation chain that is external to said channel by means of a bridge that is guided through regions where said two elements mate, characterized in that said regions are in mutual contact, so as to close said channel, and can undergo elastic deformation in order to allow the passage of said bridge between them.

BRIEF DESCRIPTION OF THE DRAWINGS

Further characteristics and advantages of the invention will become better apparent from the following detailed description of some preferred but not exclusive embodiments thereof, illustrated only by way of non-limitative example in the accompanying drawings, wherein.

DESCRIPTION OF THE PREFERRED EMBODIMENTS

Figure 1:
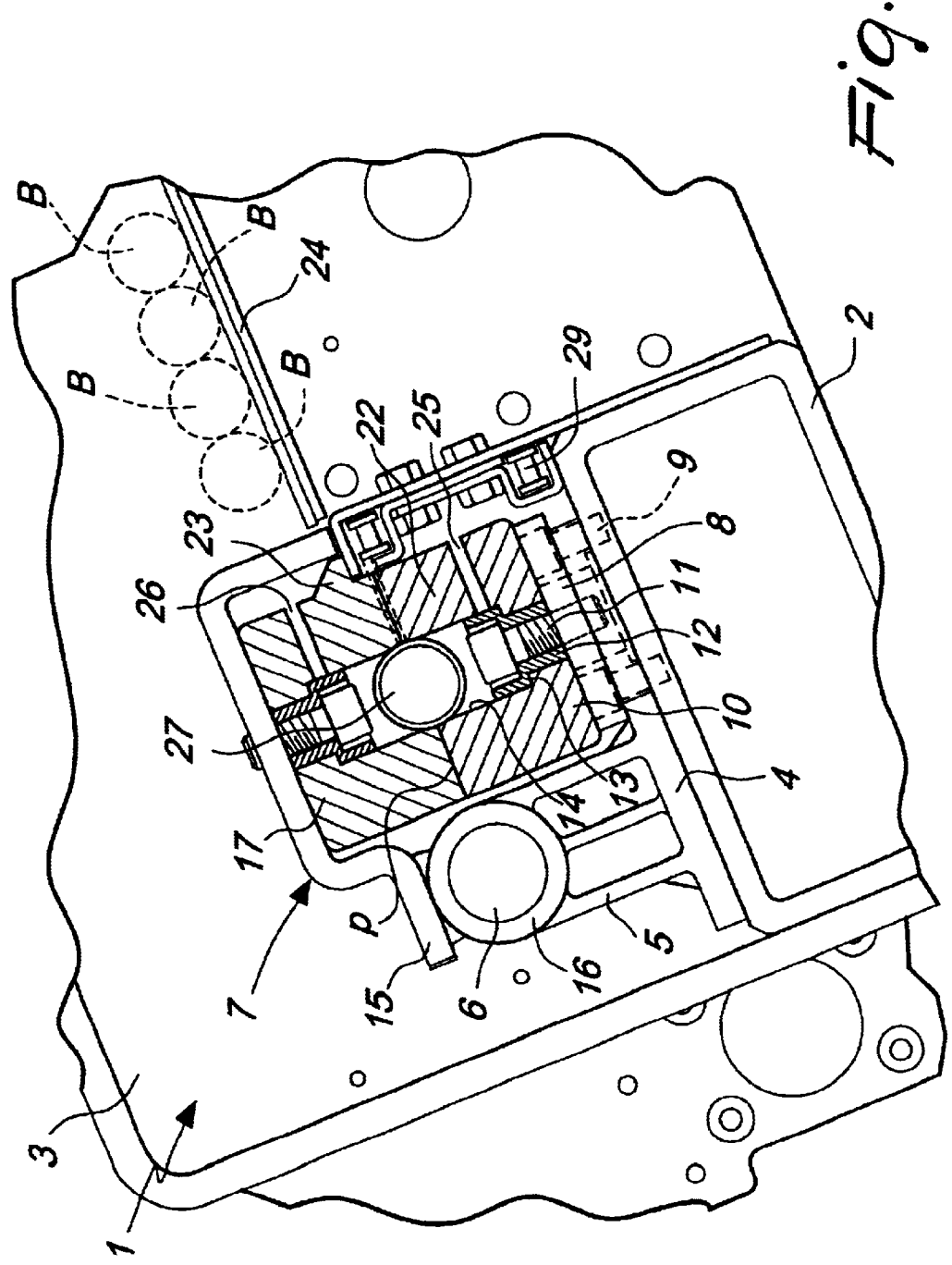
FIG. 1 is a sectional view of a guiding device according to a first embodiment and in the closed position.

With reference to FIG. 1, the reference numeral 1 generally designates a bar guiding device in a feeder for feeding a machine tool. The device 1 is composed of a beam 2 that has a rectangular tubular cross-section and lies between two side walls 3 that are rigidly coupled to the beam at its opposite ends.

A plurality of brackets 4 are fixed to the beam 2, are provided with supports 5 and rise at right angles to the beam; a longitudinal profiled element is articulated in supports 5 by means of a shaft 6, and the profiled element acts as a cover 7 of the guiding device 1.

An element 10 is fixed to the brackets 4, with the interposition of a strip 8 that is fixed by means of screws 9, and is constituted by a longitudinal body that has a rectangular cross-section and is made of a wear-resistant and elastically deformable material. The element 10 can be monolithic or can be constituted by a plurality of mutually aligned segments.

The element 10 is fixed to the strip by means of screws 11 driven through bushes 12 that are shaped so as to remain locked between the head of the screws 11 and the strip 8.

The portion of the bushes 12 in which the head of the screws 11 is recessed is wider than the remaining portion so as to form a step 13, which abuts against an annular shoulder formed in holes 14, through which the bushes and the screws are inserted in the element 10.

The cover 7 has a substantially U-shaped cross-section, with a protrusion 15 that is welded to eyes 16 whereby the cover is hinged to the shaft 6.

An element 17, having a cross-section that is substantially mirror-symmetrical with respect to the element 10 and made of the same wear-resistant flexible material, is fixed to the inner face of the cover 7, which is directed toward the beam 2. Like the element 10, the element 17 also is fixed by means of screws 11 and bushes 12.

The mutually opposite faces 18 and 19 of the elements 10 and 17 are flat and are suitable to mate on a mating plane P (see FIG. 1) when the elements are placed in mutual contact. Two respective semicircular slots 20 and 21 are formed in the mutually opposite faces 18 and 19 of the elements and are equidistant from the rotation axis of the shaft 6, so as to form a channel having a circular cross-section along which the bar to be machined is accommodated.

By way of actuation means, not shown, the cover 7 is actuated between an open position and a closed position. In the open position (see FIG. 2), edges 22 and 23 of the elements 10 and 17 are spaced one another so as to allow a bar B, which rests on an inclined plane 24, to roll downward and enter the lower slot 20. In the closed position, the edges 22, 23 are in contact on the plane P and close the bar guiding channel perfectly.

The elements 10 and 17 are completed by two longitudinal slits 25 and 26 that are formed in the elements 10 and 17 respectively so as to be co-planar to the faces 18 and 19. The slits are open on the opposite side with respect to the side on which the cover 7 is pivoted, and by way of the flexibility of the material of which the elements 10 and 17 are made they allow the edges 22 and 23 to be flexible with respect to a longitudinal axis located proximate to the bottom of the slits 25 and 26.

The bar B is pushed along the channel 20, 21 by a bar pusher 27, which by means of a bridge 28 is connected to the upper portion of a driving chain 29 that lies outside the guiding device 1. The bridge 28 is constituted by a relatively thin plate that rests on the face 18 of the element 10 and is capable of sliding thereon.

The upper and lower portions of the chain 29 slide in a housing 30 that has two parallel slots 31 and 32 closed by a metal plate 33 that is rigidly coupled to the beam 2.

The metal plate 33 has a lip 34 that is folded toward the element 10 and forms a sort of extension of the surface 24 on which the bars B roll toward the slot 20. Moreover, the lip 34 acts as an abutment for a protrusion 35 of the element 17 that is capable of cushioning the resting of the cover 7 when it is actuated into the closed position.

It is evident from the above description that in the active position of the device 1, i.e., after inserting a bar B in the lower slot 20 in front of the bar pusher 27 and after closing the cover 7, the bridge 28 remains interposed between the edges 22 and 23 of the elements 10 and 17. As shown more clearly in FIG. 3, the edges 22 and 23 of the elements 10 and 17, due to the presence of the slits 25 and 26 and of the flexibility of the material of which they are made, undergo a slight deformation at the width of the bridge, i.e., at its extension in the bar advancement direction. In this manner, the guiding channel of the bar B, formed by the slots 20 and 21, remains perfectly closed at a short distance upstream and downstream of the bridge 28, thus ensuring perfect, vibration-free guiding of the bar over the entire advancement path toward the machine tool. During the advancement stroke, the bridge can in fact penetrate between the faces 18 and 19 in contact with the edges 22 and 23 by way of the flexibility offered by the slots 25 and 26 and by the elastic nature of the material of the elements, while the edges remain closed in front of and behind the bridge, ensuring the geometric continuity of the bar guiding channel.

The invention thus conceived is susceptible of numerous modifications and variations, all of which are within the scope of the appended claims.

Figure 4:
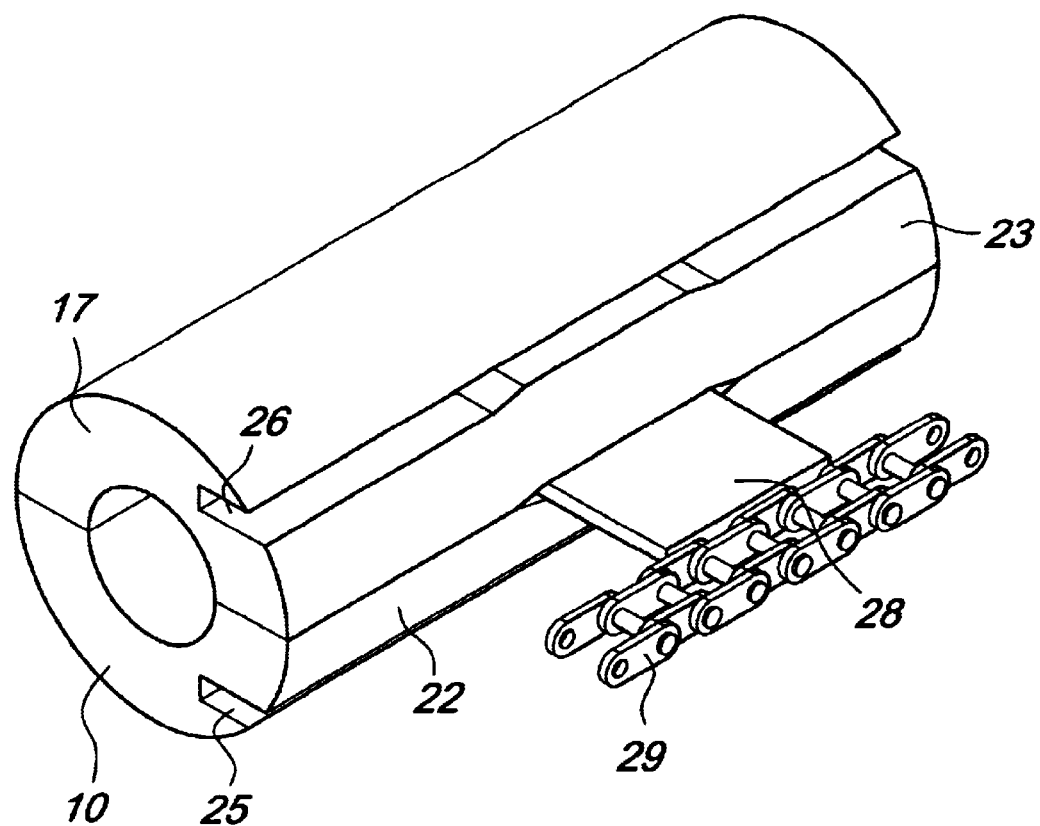
FIG. 4 is a perspective view, similar to FIG. 3, of a second embodiment.

FIG. 4 illustrates a variation in which the elements 10 and 17, while maintaining the features of the ones shown in the preceding figures, have a circular cross-section.

Figure 5:
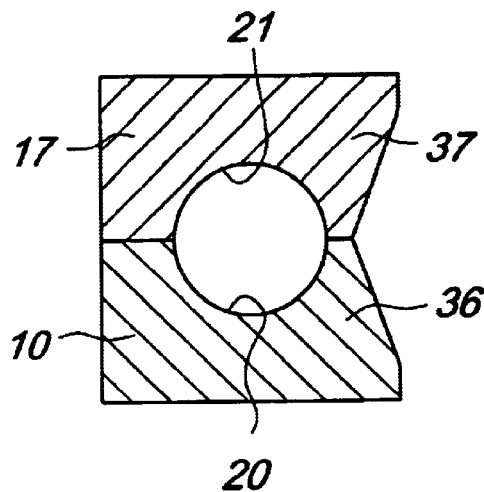
FIG. 5 is a transverse sectional view of the elements that provide the guiding channel according to a third embodiment.
Figure 6:
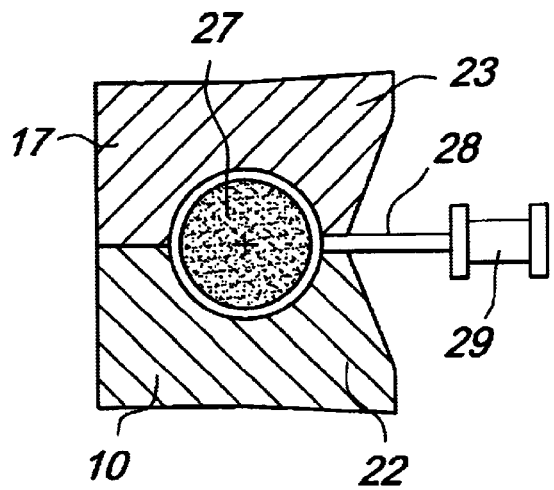
FIG. 6 is a transverse sectional view of the elements that provide the guiding channel of FIG. 5 during the passage of the bridge that entrains the bar pusher.

FIGS. 5 and 6 illustrate another version, in which the flexibility of the edges 22 and 23 is not provided by the slits 25 and 26 but by providing bevels 36 and 37 that reduce the thickness of the edges toward the mating plane, so as to reduce the advancement stress of the bridge without compromising the continuity of the guiding channel.

Figure 7:
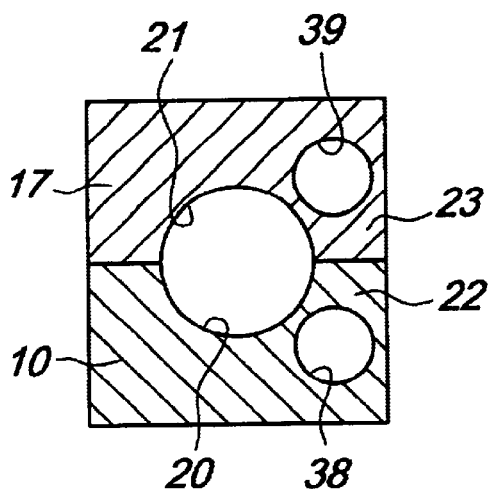
FIG. 7 is a transverse sectional view of the elements that provide the guiding channel according to a fourth embodiment.
Figure 8:
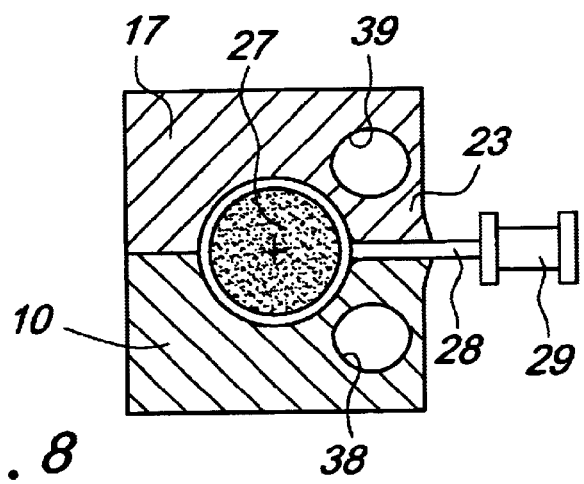
FIG. 8 is a transverse sectional view of the elements that provide the guiding channel of FIG. 7 during the passage of the bridge that entrains the bar pusher.

A similar solution is shown in FIGS. 7 and 8, in which the edges are rendered more flexible by means of circular channels 38 and 39. It should be noted that the circular channels, by compressing when the bridge 28 passes, bend outward the edges 22 and 23 and therefore space apart the opposite faces in contact with the bridge.

The inventive concept of the present invention can also be applied to a bar guiding device of the type disclosed in U.S. Pat. No. 5,584,648, which is referenced here as background to the present description. In this known device, the bars are guided by means of a plurality of assemblies that are aligned longitudinally, each assembly being composed of a pair of sprockets that can rotate about parallel axes and have semicylindrical peripheral recesses of different depths. The sprockets of each pair have constantly meshed toothed portions. At least one of the two sprockets, moreover, has a pinion that meshes with a rack that controls the angular position of the sprockets so that the identical recesses lie mutually opposite in order to form circular openings that are aligned so as to form a channel for guiding a bar. Therefore, as is evident, the longitudinally aligned sprockets of the assemblies compose two elements that are equivalent to the two elements 10, 17 of the device 1 that are designed to guide the bar B.

Figure 9:
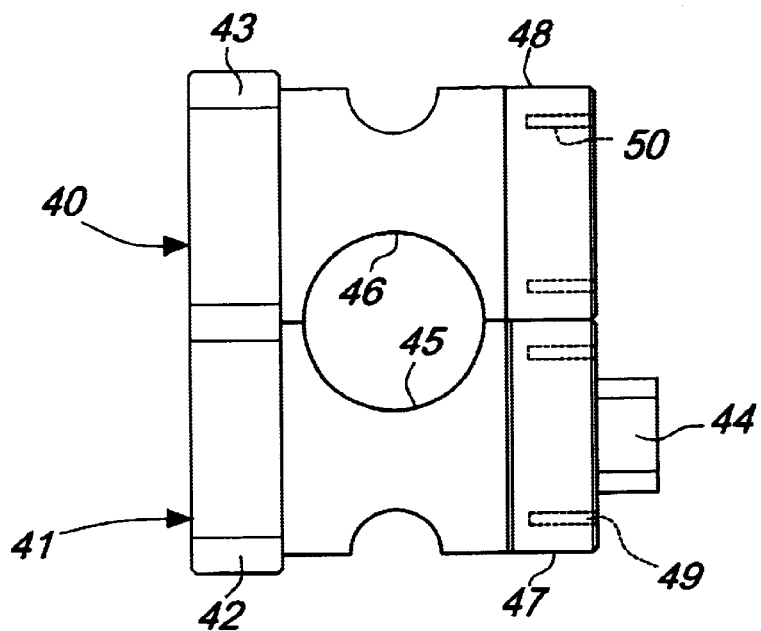
FIG. 9 is a view of the elements according to a fifth embodiment.
Figures 10, 11:
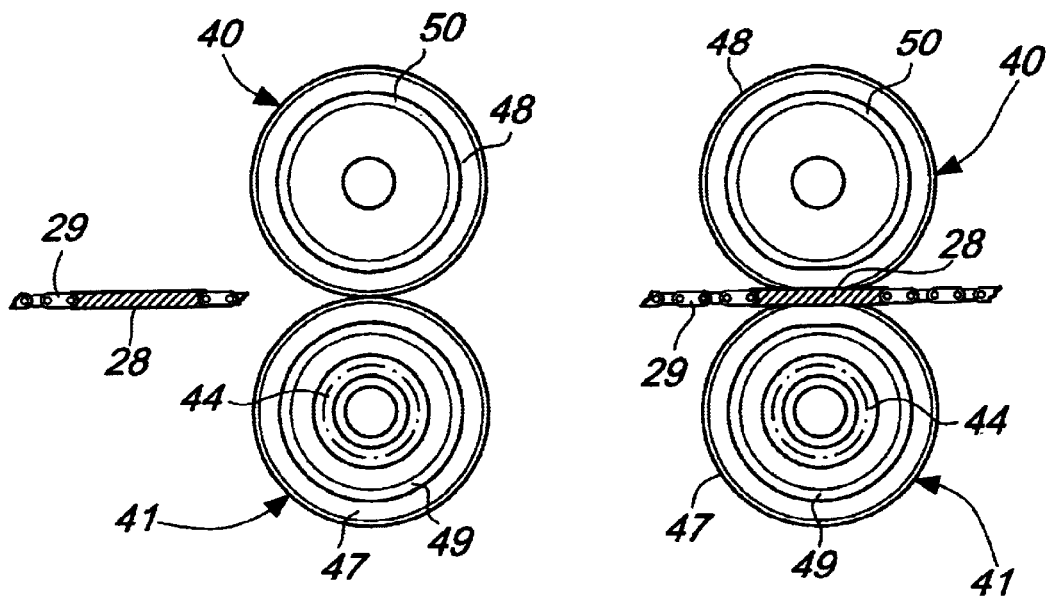
FIG. 10 is a side view of the elements of FIG. 9.
FIG. 11 is a view that is similar to FIG. 10 but is taken during the passage of the bridge.

FIGS. 9 to 11 illustrate an assembly according to U.S. Pat. No. 5,584,648, in which the reference numerals 40 and 41 designate the two sprockets, which on one side have mutually meshing gears 42 and 43. The reference numeral 44 designates a pinion that meshes with a rack that controls the mutual angular position of the sprockets, and the reference numerals 45, 46 and 55, 56 designate the recesses of various depths that form the guiding channel. The sprockets 40 and 41 have, at the ends that lie opposite with respect to the gears, respective collars 47, 48 in mutual tangential contact. In the collars 47 and 48 there are respective annular slots 49 and 50, which increase the flexibility of the peripheral edges so that said edges allow the passage of the bridge 28 while maintaining the contact of the collars of the sprockets that lie upstream and downstream of the bridge, ensuring the closure of the guiding channel.

Figure 2:
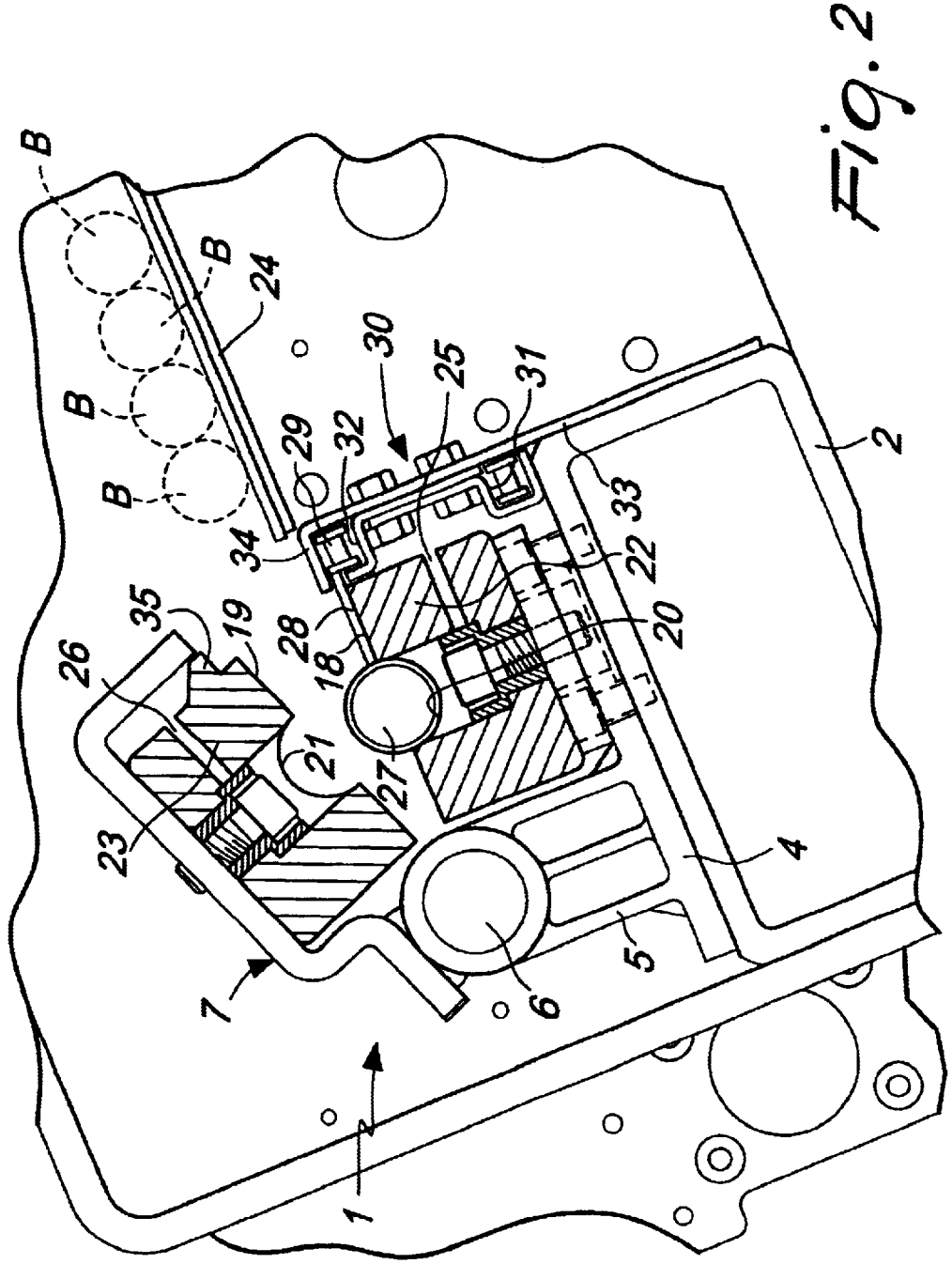
FIG. 2 is a sectional view of the device of FIG. 1 in the open position.
Figure 3:
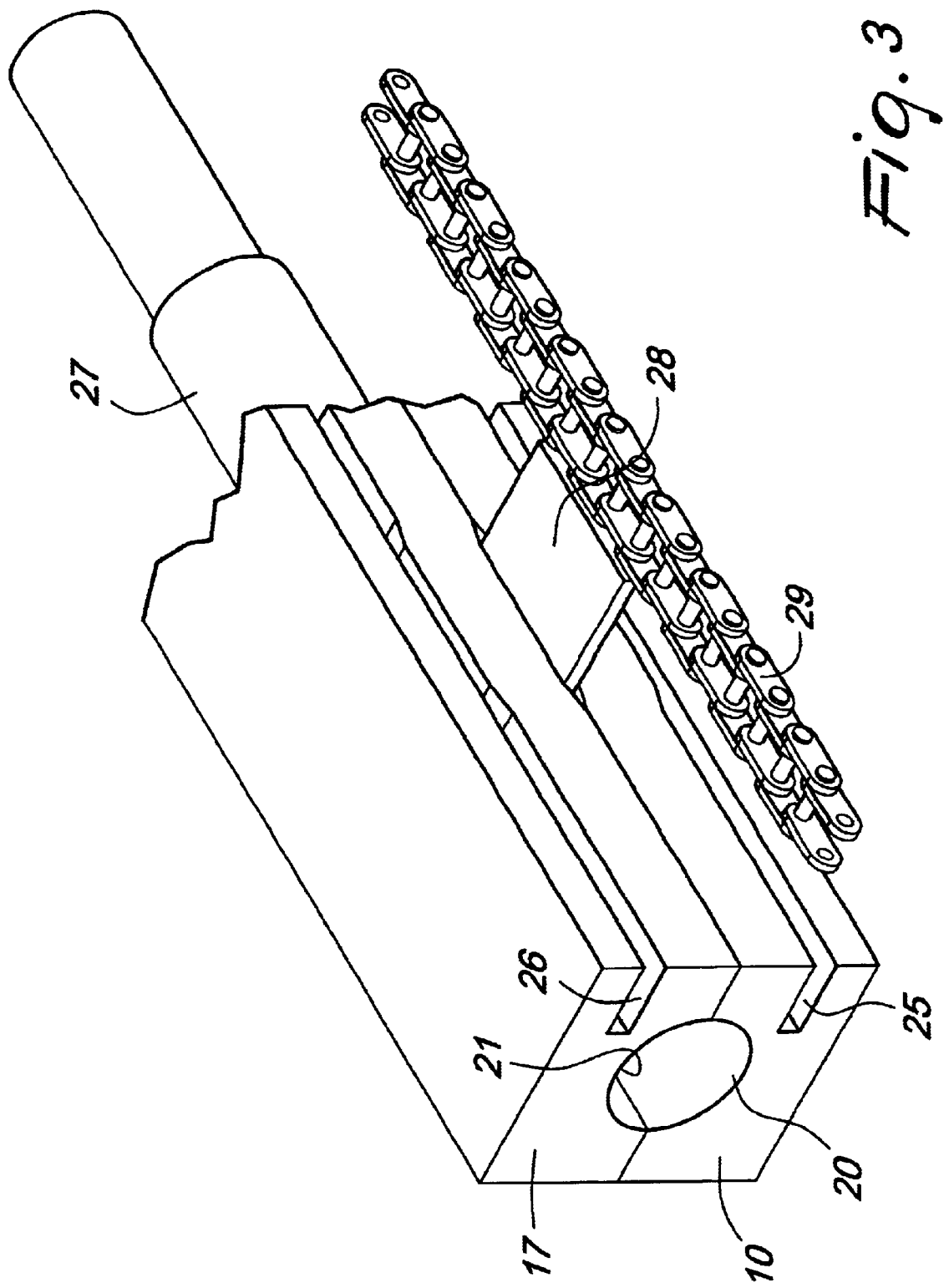
FIG. 3 is a perspective view of the elements that provide the guiding channel of the device of FIGS. 1 and 2.

In another variation, the cover can be opened by moving parallel to itself instead of about an articulation axis as shown in FIGS. 1 to 3.

In the practical execution of the invention, the materials used may be any without altering the requirements of wear-resistance and flexibility required for guiding particularly abrasive polygonal bars.

The disclosures in Italian Patent Application No. BO2001A000770 from which this application claims priority are incorporated herein by reference.

What is claimed is:

1. A bar guiding device in a feeder for feeding a machine tool, composed of two elements that have respective slots and can move with respect to each other between an open position, which allows insertion of a bar between them, and a mutually adjacent position, at which said slots form a longitudinal channel for the advancement of a bar to be fed to the machine tool by way of a bar pusher that is connected to an actuation chain that is external to said channel by means of a bridge that is guided through regions where said elements mate, wherein said regions are in mutual contact, so as to close said channel, and can undergo elastic deformation in order to allow passage of said bridge between them.

2. The device according to claim 1, wherein said elements are extended longitudinally and have, on a side where the bridge of the bar pusher passes, longitudinal slits that form mutually opposite and mating flexible edges, which constitute said regions.

3. The device according to claim 1, wherein said elements are extended longitudinally and have, on a side where the bridge of the bar pusher passes, mutually opposite mating edges which are chamfered so as to constitute said regions.

4. The device according to claim 1, wherein said elements are extended longitudinally and have, on a side where the bridge of the bar pusher passes, mutually opposite mating edges which have channels suitable to render said edges flexible in order to constitute said regions.

5. The device according to claim 1, wherein said elements have a rectangular or circular cross-section.

6. The device according to claim 1, wherein one of said elements is fixed and another one is rigidly coupled to a profiled element, so as to act as a cover for said fixed element.

7. The device according to claim 1, wherein said pair of elements is constituted by a plurality of assemblies, each composed of two sprockets according to U.S. Pat. No. 5,584,648, and wherein said sprockets have, on the side where the bridge of the bar pusher passes, collars in tangential contact, in front of which there are annular slots that are suitable to render the edges of said collars flexible in order to allow the passage of said bridge.

* * * * *